US011599966B2

(12) United States Patent
Kelly et al.

(10) Patent No.: US 11,599,966 B2

(45) Date of Patent: Mar. 7, 2023

(54) FRAME RATE OPTIMIZATION SYSTEM

(71) Applicant: Dell Products L.P., Round Rock, TX (US)

(72) Inventors: John Kelly, Mallow (IE); Nicholas Chase Busick, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 101 days.

(21) Appl. No.: 17/322,620

(22) Filed: May 17, 2021

(65) Prior Publication Data

US 2022/0366523 A1 Nov. 17, 2022

(51) Int. Cl.

*H04N 7/01* (2006.01)
*G06T 1/20* (2006.01)
*G06F 9/455* (2018.01)

(52) U.S. Cl.

CPC ............ *G06T 1/20* (2013.01); *G06F 9/45558* (2013.01); *H04N 7/0127* (2013.01); *G06F 2009/45579* (2013.01); *G06F 2009/45591* (2013.01); *G09G 2340/0435* (2013.01)

(58) Field of Classification Search

None

See application file for complete search history.

(56) References Cited

U.S. PATENT DOCUMENTS

2014/0289423 A1* 9/2014 Kim .................... H04L 47/2416 709/233
2020/0241894 A1* 7/2020 Li ........................ G06F 9/45558
2021/0012747 A1* 1/2021 Wang .................... G06F 1/3206

OTHER PUBLICATIONS

Agrawal et al.,"VMware Horizon 6 with View Performance and Best Practices," Technical White Paper / p. 5, VMware, Inc., 2015, 25 pages, available at: https://www.vmware.com/content/dam/digitalmarketing/vmware/en/pdf/techpaper/vmware-horizon-6-view-performance-best-practices.pdf, Apr. 2015.

* cited by examiner

*Primary Examiner* — Joni Hsu

(74) *Attorney, Agent, or Firm* — Joseph Mencher

(57) ABSTRACT

A networked system includes an application that produces application frames at a first application frame rate, a graphics processing system that processes the application frames to produce graphics frames at a first graphics frame rate, a VDI system that processes the graphics frames to produce VDI frames at a first VDI frame rate, and an endpoint device that processes the VDI frames to produce endpoint frames at an endpoint frame rate. A frame rate optimization system monitors the application processing, the graphics processing, the VDI processing, and the endpoint processing and, based on the endpoint frame rate, reconfigures at least one of: the application to produce the application frames at a second application frame rate, the graphics processing system to produce the graphics frames at a second graphics frame rate, or the VDI system to produce the VDI frames at a second VDI frame rate.

20 Claims, 7 Drawing Sheets

200
FRAME RATE OPTIMIZATION SYSTEM 208/300
MONITORING SUB-ENGINE 304a
FRAME RATE OPTIMIZATION DATABASE 306
506
CONFIGURATION SUB-ENGINE 304b
508c
508b
508a
502c
502b
502a
ENDPOINT DEVICE 206a
VDI SYSTEM 202c
GRAPHICS PROCESSING SYSTEM 202b
APPLICATION SYSTEM 202a
500

FRAME RATE OPTIMIZATION SYSTEM

BACKGROUND

The present disclosure relates generally to information handling systems, and more particularly to optimizing frame rates for frames that are rendered and encoded for display on an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, desktop computing devices, laptop/notebook computing devices, table computing devices, mobile phones, and/or other computing devices known in the art, are often utilized to display video, graphics, and/or other images or frames that are produced for consecutive display. For example, as many businesses move to a remote-work paradigm, the use of Virtual Desktop Infrastructure (VDI) is increasing proportionally due to the benefits it provides in relation to security, operational simplicity, and/or other benefits known in the art. The increased adoption of VDI has included many end users with relatively high-end video and/or graphics requirements, which tend to be accompanied by relatively high frame rates for applications related to media, entertainment, gaming development, engineering Computer Aided Design (CAD), and/or other relatively high frame rate applications known in the art. However, the frame rate "pipeline" that produces the frame rate for video, graphics, and/or other images or frames that are produced for consecutive display on an endpoint device is relatively complex, and can result in less than optimal experiences by the end users of those endpoint devices.

For example, the frame rate "pipeline" discussed above may include an application that may be configured to or capable of rendering frames at a particular frame rate, a graphics processing system (e.g., a virtual Graphics Processing Unit (vGPU)) that is configured to or capable of rendering frames at a particular frame rate (and in some cases configured to or capable of encoding frames at a particular frame rate), a VDI system that is configured to or capable of encoding frames at a particular frame rate, and the endpoint device that is configured to or capable of decoding frames at a particular frame rate. The inventors of the present disclosure have recognized how the misalignment of these frame rate rendering and encoding configurations/capabilities can result in poor end user experiences or wasted resources. For example, the application and/or the graphics processing system may render frames at a frame rate that is below what the VDI is configured (or has the capability) to encode, and/or that is below what the endpoint device is configured (or has the capability) to decode, resulting in a sub-optimal end user experience. In another example, the application and/or the graphics processing system may render frames at a frame rate that exceeds what the VDI is configured (or has the capability) to encode, and/or that exceeds what the endpoint device is configured (or has the capability) to decode, resulting in wasted processing resources.

Accordingly, it would be desirable to provide a frame rate optimization system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a frame rate optimization engine that is configured to: monitor first application frame processing operations performed by an application to produce application frames at a first application frame rate, first graphics frame processing operations performed by a graphics processing system to produce graphics frames at a first graphics frame rate, first Virtual Desktop Infrastructure (VDI) frame processing operations performed by a VDI system to produce VDI frames at a first VDI frame rate, and endpoint frame processing operations performed by an endpoint device to produce endpoint frames at an endpoint frame rate; and reconfigure, based on the endpoint frame rate produced for the endpoint frames by the endpoint device via the performance of the endpoint frame processing operations, at least one of: the application to perform second application frame processing operations to produce the application frames at a second application frame rate; the graphics processing system to perform second graphics frame processing operations to produce the graphics frames at a second graphics frame rate; or the VDI system to perform second VDI frame processing operations to produce the VDI frames at a second VDI frame rate.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
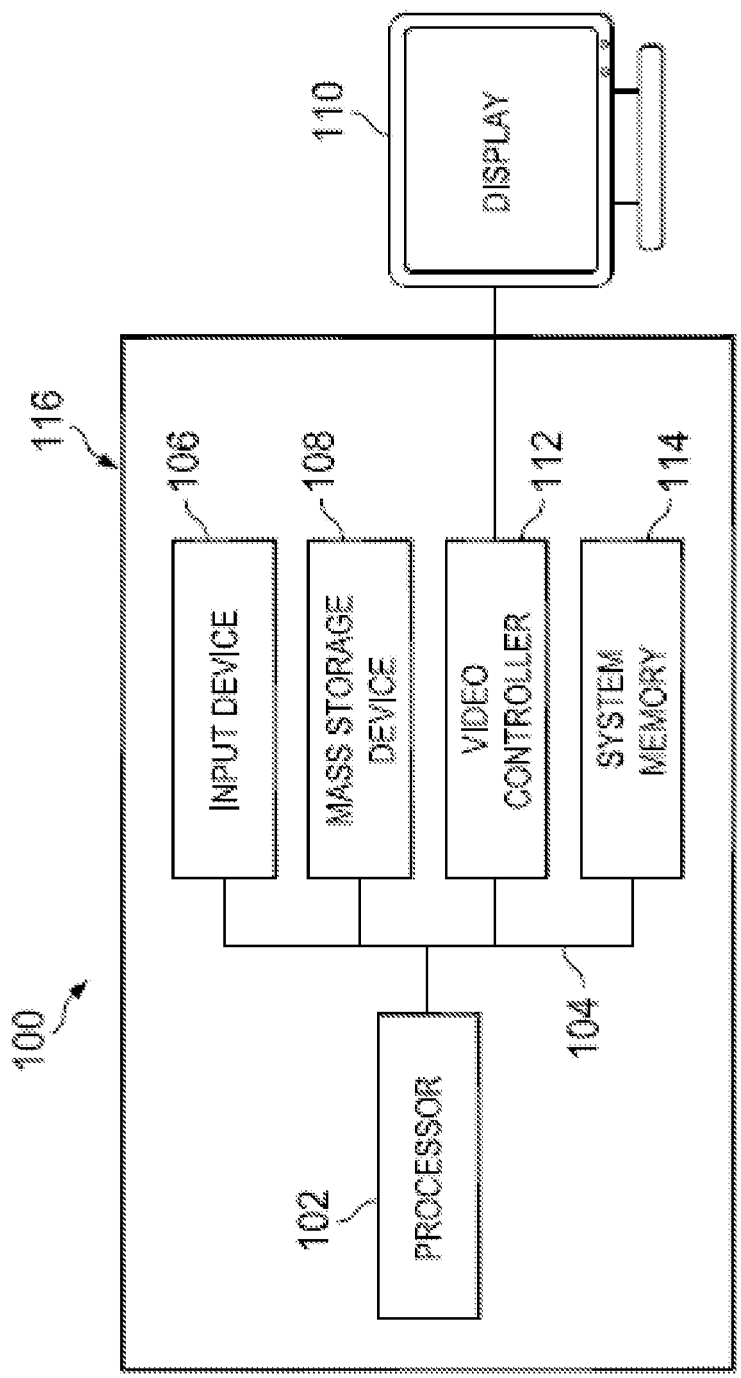
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
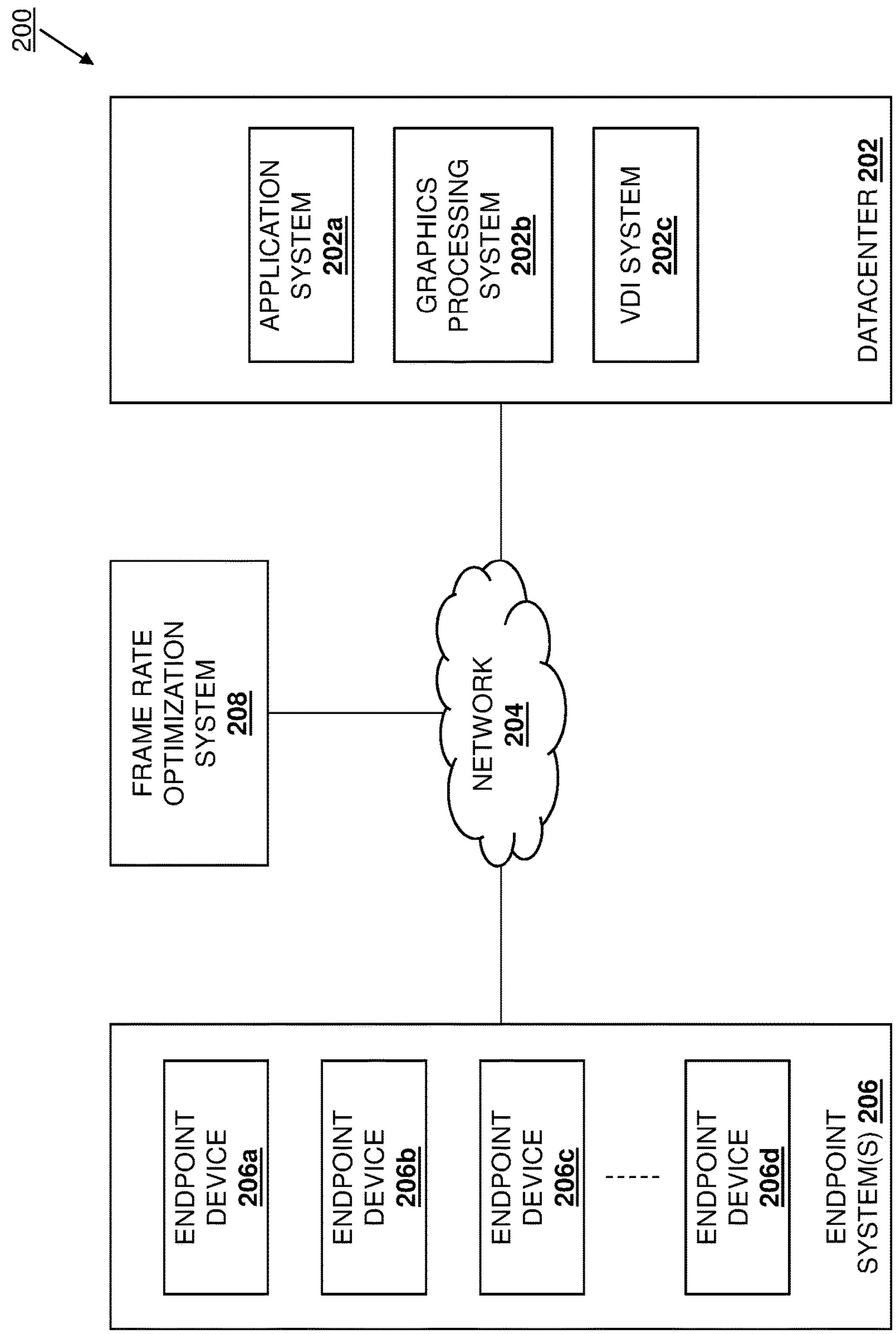
FIG. 2 is a schematic view illustrating an embodiment of a networked system that may include the frame rate optimization system of the present disclosure.

Referring now to FIG. 2, an embodiment of a networked system 200 is illustrated. In the illustrated embodiment, the networked system 200 includes a datacenter 202 having an application system 202*a*, a graphics processing system 202*b*, and a Virtual Desktop Infrastructure (VDI) system 202*c*. In an embodiment, the application system 202*a* may be provided by the IHS 100 discussed above with reference to FIG. 1, may include some or all of the components of the IHS 100, and in specific examples may include an application provided by one or more one or more server devices that are configured to perform the frame rendering discussed below, as well as any of a variety of other application functionality that would be apparent to one of skill in the art in possession of the present disclosure. However, while illustrated and discussed as being provided by server device(s), one of skill in the art in possession of the present disclosure will recognize that application systems provided in the networked system 200 may include any devices that may be configured to operate similarly as the application system 202*a* discussed below.

In an embodiment, the graphics processing system 202*b* may be provided by the IHS 100 discussed above with reference to FIG. 1, may include some or all of the components of the IHS 100, and in specific examples may include virtual Graphics Processing Units (vGPUs) provided by one or more physical GPUs in one or more server devices that are configured to perform the frame rendering (and in some cases, frame encoding) discussed below, as well as any of a variety of other graphics processing functionality that would be apparent to one of skill in the art in possession of the present disclosure. However, while illustrated and discussed as being provided by vGPUs in server device(s), one of skill in the art in possession of the present disclosure will recognize that graphics processing systems provided in the networked system 200 may include any devices that may be configured to operate similarly as the graphics processing system 202*b* discussed below.

In an embodiment, the VDI system 202*c* may be provided by the IHS 100 discussed above with reference to FIG. 1, may include some or all of the components of the IHS 100, and in specific examples may include one or more server devices that are configured to perform the frame encoding discussed below, as well as any of a variety of other VDI functionality that would be apparent to one of skill in the art in possession of the present disclosure. However, while illustrated and discussed as being provided by server device(s), one of skill in the art in possession of the present disclosure will recognize that VDI systems provided in the networked system 200 may include any devices that may be configured to operate similarly as the VDI system 202*c* discussed below. Furthermore, while the application system 202*a*, the graphics processing system 202*b*, and the VDI system 202*c* are illustrated and discussed below as being provided in the datacenter 202, one of skill in the art in possession of the present disclosure will recognize that the portion of the frame rate pipeline described below as being provided by applications, graphics processing systems, and VDI systems may be provided outside of a datacenter while remaining within the scope of the present disclosure as well.

In the illustrated embodiment, each of the application system 202*a*, the graphics processing system 202*b*, and the VDI system 202*c* in the datacenter 202 is coupled to a network 204 that may be provided a Local Area Network (LAN), the Internet, combinations thereof, and/or any of a variety of other networks that would be apparent to one of skill in the art in possession of the present disclosure. The networked system 200 may also include one or more endpoint systems 206 that are coupled to the network 204 and that may each include a plurality of endpoint devices 206*a*, 206*b*, 206*c*, and up to 206*d*. In an embodiment, any or all of the endpoint devices 206*a*-206*d* may be provided by the IHS 100 discussed above with reference to FIG. 1, may include some or all of the components of the IHS 100, and in specific examples, may include desktop computing devices, laptop/notebook computing devices, tablet computing devices, mobile phones, and/or other computing devices that would be apparent to one of skill in the art in possession of the present disclosure. However, while illustrated and discussed as being provided by particular computing devices, one of skill in the art in possession of the present disclosure will recognize that endpoint devices provided in the networked system 200 may include any devices that may be configured to operate similarly as the endpoint devices 206*a*-206*d* discussed below.

In the illustrated embodiment, the networked system 200 also include a frame rate optimization system 208 that is coupled via the network 204 to the datacenter 202 and the endpoint system(s) 206, but one of skill in the art in possession of the present disclosure will appreciate how the frame rate optimization system 208 may be included in the datacenter 202 or the endpoint system(s) 206 while remaining within the scope of the present disclosure as well. In an embodiment, the frame rate optimization system 208 may be provided by the IHS 100 discussed above with reference to FIG. 1, may include some or all of the components of the IHS 100, and in specific examples may include one or more server devices that are configured to perform the frame rate optimization functionality discussed below. However, while illustrated and discussed as being provided by server device(s), one of skill in the art in possession of the present disclosure will recognize that the frame rate optimization system provided in the networked system 200 may include any devices that may be configured to operate similarly as the frame rate optimization system 208 discussed below.

Furthermore, while the discussion below describes the endpoint system 206 as a business environment in which each of the endpoint devices 206*a*-206*d* utilizes VDI functionality enabled via the datacenter 202, and the frame rate optimization system 208 provides the frame rate optimization functionality of the present disclosure on frames provided via that VDI functionality, one of skill in the art in possession of the present disclosure will appreciate that the frame rate optimization system may be utilized to optimize other frame rate pipelines while remaining within the scope of the present disclosure as well. Further still, while a specific networked system 200 has been illustrated and described, one of skill in the art in possession of the present disclosure will recognize that the frame rate optimization system of the present disclosure may include a variety of components and component configurations while remaining within the scope of the present disclosure.

Figure 3:
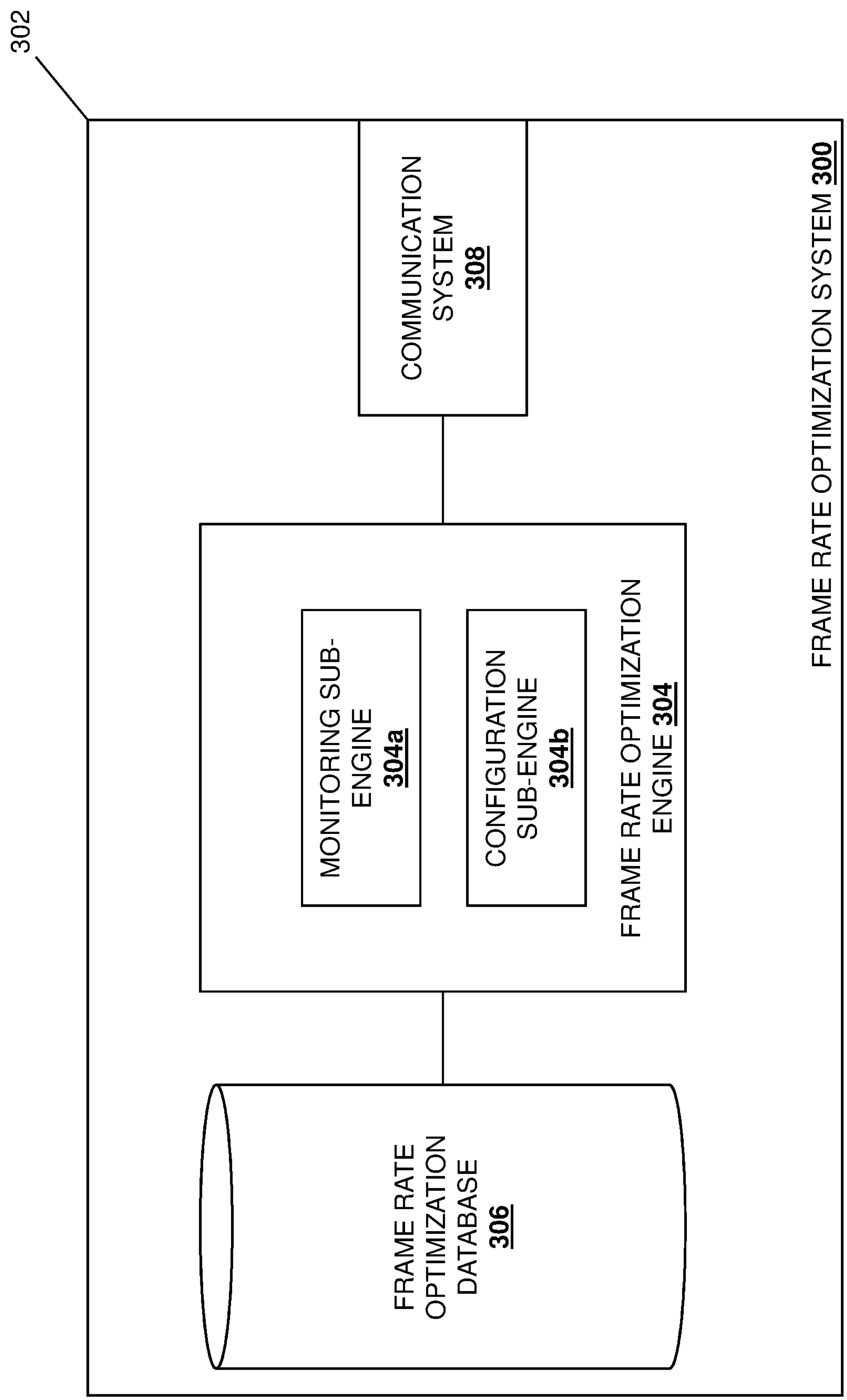
FIG. 3 is a schematic view illustrating an embodiment of a frame rate optimization system that may be included in the networked system of FIG. 2.

Referring now to FIG. 3, an embodiment of a frame rate optimization system 300 is illustrated that may provide the frame rate optimization system 208 discussed above with reference to FIG. 2. As such, the frame rate optimization system 300 may be provided by the IHS 100 discussed above with reference to FIG. 1 and/or may include some or all of the components of the IHS 100, and in specific examples may be provided by one or more server devices. However, while illustrated and discussed as being provided by one or more server devices, one of skill in the art in possession of the present disclosure will recognize that the functionality of the frame rate optimization system 300 discussed below may be provided by other devices that are configured to operate similarly as the frame rate optimization system 300 discussed below. In the illustrated embodiment, the frame rate optimization system 300 includes a chassis 302 that houses the components of the frame rate optimization system 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a frame rate optimization engine 304 that is configured to perform the functionality of the frame rate optimization engines and/or frame rate optimization systems discussed below.

In the illustrated embodiments discussed below, the frame rate optimization engine 304 includes a monitoring sub-engine that is configured to monitor the frame rate processing operations performed by the frame rate pipeline components in the frame rate pipeline discussed below, as well as a configuration sub-engine 304*b* that is configured to perform the frame rate pipeline configuration operations on the frame rate pipeline components in the frame rate pipeline discussed below. However, while illustrated and discussed as including specific sub-engines, one of skill in the art in possession of the present disclosure will recognize that the functionality of the frame rate optimization engine 304 may be enabled in a variety of manners while remaining within the scope of the present disclosure as well.

The chassis 302 may also house a storage system (not illustrated, but which may include the storage 108 discussed above with reference to FIG. 1) that is coupled to the frame rate optimization engine 304 (e.g., via a coupling between the storage system and the processing system) and that includes a frame rate optimization database 306 that is configured to store any of the information utilized by the frame rate optimization engine 304 discussed below. The chassis 302 may also house a communication system 308 that is coupled to the frame rate optimization engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, cellular components, etc.), and/or any other communication components that would be apparent to one of skill in the art in possession of the present disclosure. However, while a specific frame rate optimization system 300 has been illustrated, one of skill in the art in possession of the present disclosure will recognize that frame rate optimization systems (or other devices operating according to the teachings of the present disclosure in a manner similar to that described below for the frame rate optimization system 300) may include a variety of components and/or component configurations for providing conventional functionality, as well as the functionality discussed below, while remaining within the scope of the present disclosure as well.

Figure 4:
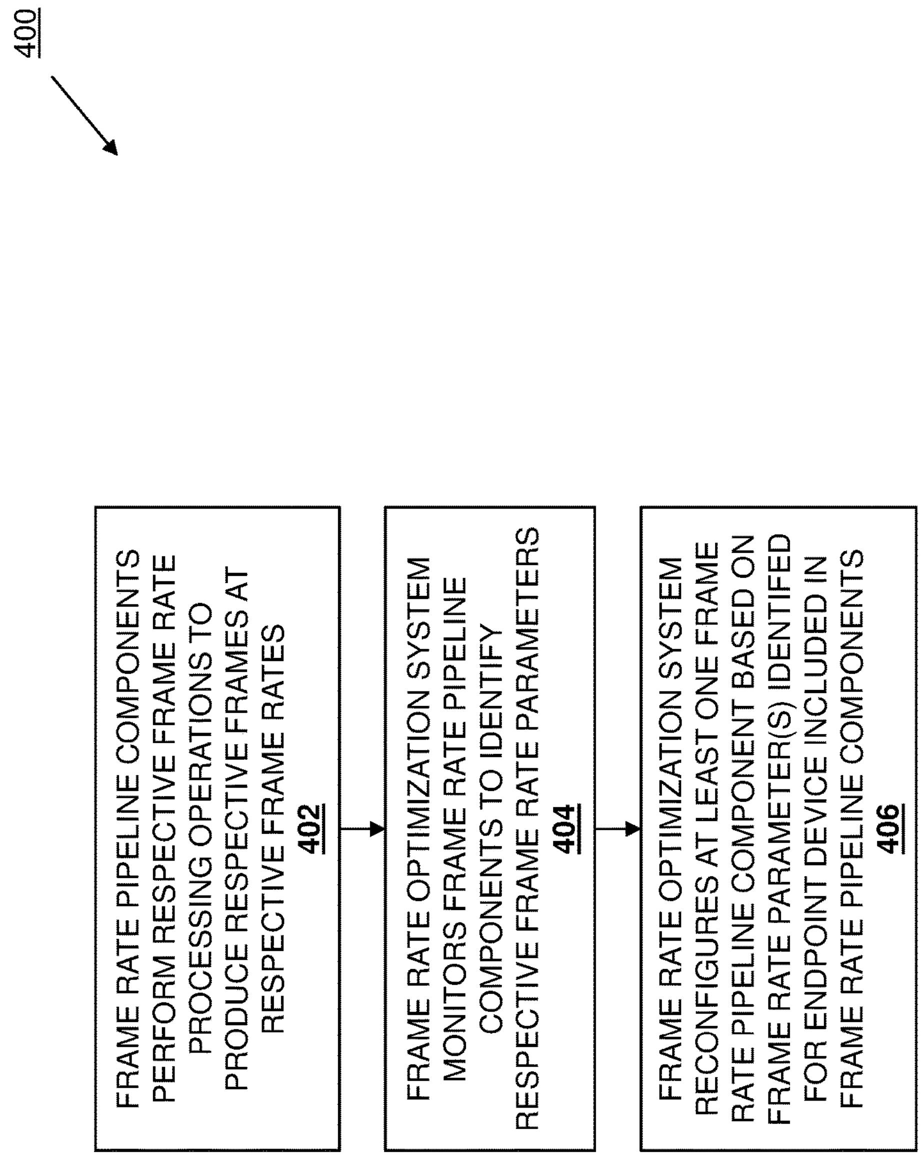
FIG. 4 is a flow chart illustrating an embodiment of a method for optimizing frame rates.

Referring now to FIG. 4, an embodiment of a method 400 for optimizing frame rates is illustrated. As discussed below, the systems and methods of the present disclosure provide for the optimization of a frame rate pipeline to ensure that the frame rate being rendered and encoded for frames provided for display on an endpoint device is maximized for the current capabilities of that endpoint device to optimize the experience at the endpoint device while not wasting resources in the frame rate pipeline. For example, a networked system may include a frame rate pipeline including an application that produces application frames at a first application frame rate, a graphics processing system that processes the application frames to produce graphics frames at a first graphics frame rate, a VDI system that processes the graphics frames to produce VDI frames at a first VDI frame rate, and an endpoint device that processes the VDI frames to produce endpoint frames at an endpoint frame rate. A frame rate optimization system monitors the application processing, the graphics processing, the VDI processing, and the endpoint processing and, based on the endpoint frame rate, reconfigures at least one of: the application to produce the application frames at a second application frame rate, the graphics processing system to produce the graphics frames at a second graphics frame rate, or the VDI system to produce the VDI frames at a second VDI frame rate. As such, in some embodiments, each of the application, the graphics processing system, and the VDI system may be synchronized to produce frames at a common frame rate that is equal to the endpoint frame rate to optimize the experience at the endpoint device without wasting resources associated with the application, graphics processing system, and VDI system.

Figure 5A:
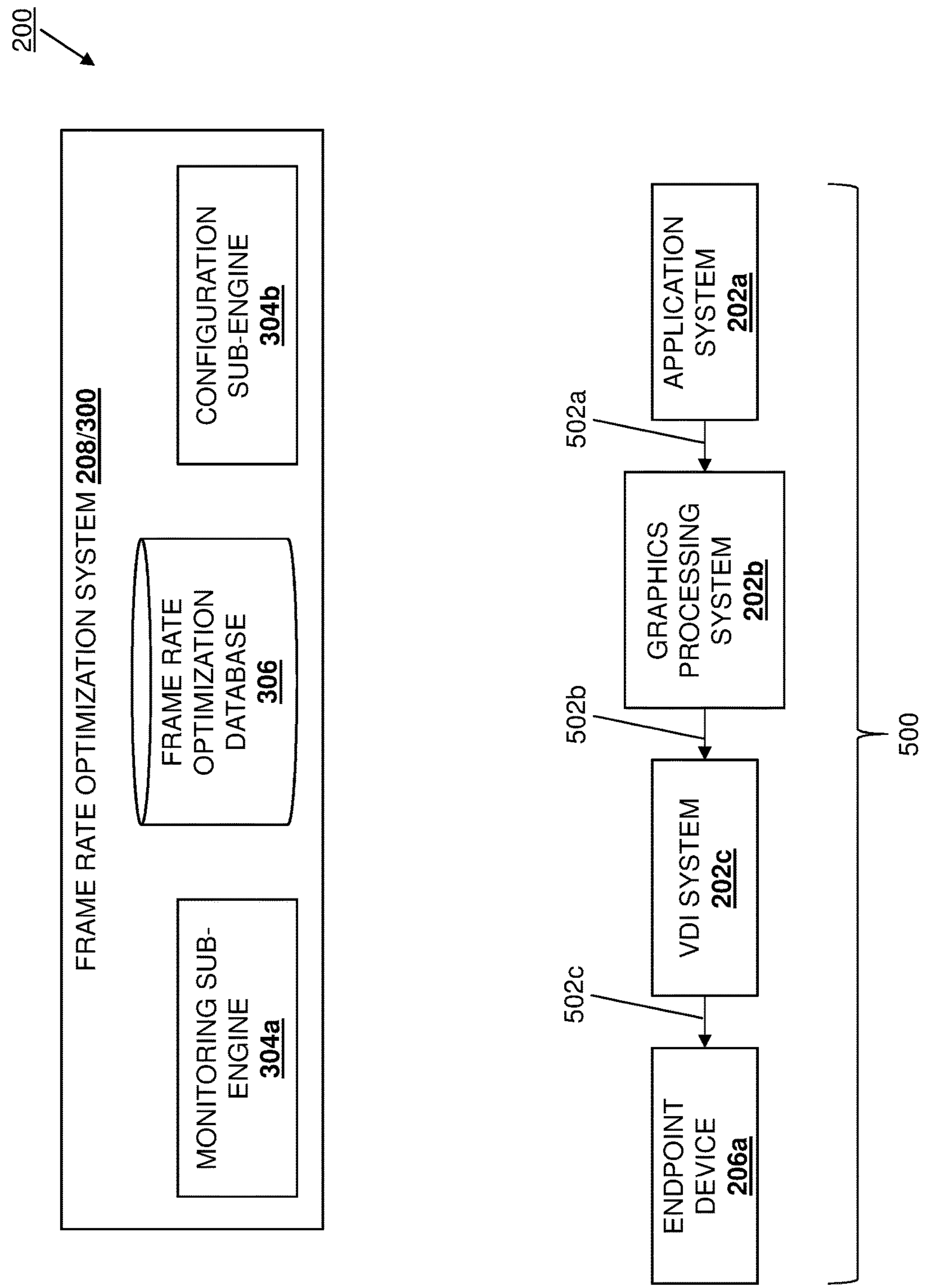
FIG. 5A is a schematic view illustrating an embodiment of the networked system of FIG. 2 and the frame rate optimization system of FIG. 3 operating during the method of FIG. 4.

The method 400 begins at block 402 where frame rate pipeline components perform respective frame rate processing operations to produce respective frames at respective frame rates. Referring now to FIG. 5A, an embodiment of the networked system 200 is illustrated that shows a frame rate pipeline for the endpoint device 206*a* that includes frame rate pipeline components including the application system 202*a*, the graphics processing system 202*b*, the VDI system 202*c*, and the endpoint device 206*a*. Furthermore, while a frame rate pipeline 500 for the endpoint device 206*a* is illustrated and described below, one of skill in the art in possession of the present disclosure will appreciate how similar frame rate pipelines may be provided for each of the endpoint device 206*b*-206*d* while remaining within the scope of the present disclosure as well. In an embodiment, at block 402, an application in the application system 202*a* being utilized by the endpoint device 206*a* may perform (e.g., in response to instructions received from the endpoint device 206*a*) first application frame rate processing operations that include rendering frames to produce application frames at a first application frame rate. The application in the application system 202*a* being utilized by the endpoint device 206*a* may then perform application frame transmission operations 502*a* to transmit those application frames to the graphics processing system 202*b*.

At block 402, the graphics processing system 202*b* may receive the application frames from the application system 202*a* as part of the application frame transmission operations 502*a* and, in response, may perform first graphics frame rate processing operations that include rendering the application frames to produce graphics frames at a first graphics frame rate. Furthermore, one of skill in the art in possession of the present disclosure will appreciate how, in some cases, the first graphics frame rate processing operations performed by the graphics processing system 202*b* may include encoding operations (in addition to the rendering operations) to produce the graphics frames at the first graphics frame rate. The graphics processing system 202*b* may then perform graphics frame transmission operations 502*b* to transmit those graphics frames to the graphics processing system 202*b*.

At block 402, the VDI system 202*c* may receive the graphics frames from the graphics processing system 202*b* as part of the graphics frame transmission operations 502*b* and, in response, may perform first VDI frame rate processing operations that include encoding the graphics frames to produce VDI frames at a first VDI frame rate. The VDI system 202*c* may then perform VDI frame transmission operations 502*c* to transmit those VDI frames to the endpoint device 206*a*. At block 402, the endpoint device 206*a* may receive the VDI frames from the VDI system 202*c* as part of the VDI frame transmission operations 502*c* and, in response, may perform endpoint frame rate processing operations that include decoding the VDI frames to produce endpoint frames at an endpoint frame rate. The endpoint device 206*a* may then perform endpoint frame display operations to display the endpoint frames at the endpoint frame rate on a display device (not illustrated, but which may include the display 110 discussed above with reference to FIG. 1.)

As will be appreciated by one of skill in the art in possession of the present disclosure, the terms "application frames", "application frame rate", "graphics frames", "graphics frame rate", "VDI frames", "VDI frame rate", "endpoint frames", and "endpoint frame rate" are utilized herein to indicate that any of the first application frame rate processing operations by the application in the application system 202*a*, the first graphics frame rate processing operations by the graphics processing system 202*b*, the first VDI frame rate processing operations by the VDI system 202*c*, and the endpoint frame rate processing operations by the endpoint device 206*a* may produce frames at a particular frame rate. As such, one of skill in the art in possession of the present disclosure will appreciate how the application frames produced by the application in the application system 202*a*, the graphics frames produced by the graphics processing system 202*b*, the VDI frames produced by the VDI system 202*c*, and the endpoint frames produced by the endpoint device 206*a*, may all include the same images, but the frame rate for those frames produced by the rendering and/or encoding may differ.

As discussed in further detail below, each of the application in the application system 202*a*, the graphics processing system 202*b*, the VDI system 202*c*, and the endpoint device 206*a*, may include frame rate processing parameters that include a frame rate setting that may include a user/default defined frame rate that should be produced via the frame rate processing operations by that frame rate pipeline component, a maximum frame rate capability that may include a maximum frame rate capable of being produced via the frame rate processing operations by that frame rate pipeline component, a delivered frame rate that may include a monitored frame rate that is actually being produced via the frame rate processing operations by that frame rate pipeline component, and/or other frame rate processing parameters that would be apparent to one of skill in the art in possession of the present disclosure. For example, any of the application in the application system 202*a*, the graphics processing system 202*b*, the VDI system 202*c*, and the endpoint device 206*a* may be set to produced a desired frame rate via its frame rate setting, which may be below or up to its maximum frame rate capability, and during operation will produce frames at the delivered frame rate (which it will attempt to have equal to the frame rate setting, but which may be lower than the frame rate setting due to, for example, a lack of processing resources to enable the frame rate defined by the frame rate setting).

As discussed above, conventional frame rate pipeline components are not coordinated and, as such, the different frame rates produced for frames processed through the frame rate pipeline for display at the endpoint device may provide a non-optimized endpoint device experience, or may waste resources in the frame rate pipeline. Using an example with the frame rate pipeline components in the frame rate pipeline 500 illustrated in FIG. 5A, the endpoint device 206*a* may include an endpoint frame rate setting and/or an endpoint delivered frame rate of 60 Frame Per Second (FPS), while the application in the application system 202*a* may include an application frame rate setting and/or an application delivered frame rate of 60 FPS, the graphics processing system 202*b* may include a graphics frame rate setting and/or a graphics delivered frame rate of 50 FPS (while including a maximum graphics frame rate capability of 60 FPS or greater), and the VDI system 202*c* may include a VDI frame rate setting and/or VDI delivered frame rate of 40 FPS (while including a maximum VDI frame rate capability of 60 FPS or greater). As such, while the endpoint device 206*a* is capable of producing endpoint frames at 60 FPS and the application in the application system 202*a* produces application frames at 60 FPS, the graphics processing system 202*b* produces graphics frames at 50 FPS and the VDI system 202*c* produces VDI frames at 40 FPS, limiting the endpoint device 206*a* to producing the endpoint frames at 40 FPS and reducing the experience at the endpoint device 206*a* from a possible 60 FPS to 40 FPS.

Using another example with the frame rate pipeline components in the frame rate pipeline 500 illustrated in FIG. 5A, the endpoint device 206*a* may include an endpoint frame rate setting and/or an endpoint delivered frame rate of 30 Frame Per Second (FPS), while the application in the application system 202*a* may include an application frame rate setting and/or an application delivered frame rate of 60 FPS, the graphics processing system 202*b* may include a graphics frame rate setting and/or a graphics delivered frame rate of 50 FPS, and the VDI system 202*c* may include a VDI frame rate setting and/or VDI delivered frame rate of 40 FPS. As such, the endpoint device 206*a* is capable of producing endpoint frames at 30 FPS, while the application in the application system 202*a* produces application frames at 60 FPS, the graphics processing system 202*b* produces graphics frames at 50 FPS and the VDI system 202*c* produces VDI frames at 40 FPS, wasting resources in the application system 202*a* (which is producing application frames at 30 FPS higher than the endpoint device 206*a* can currently produce), the graphics processing system 202*b* (which is producing graphics frames at 20 FPS higher than the endpoint device 206*a* can currently produce), and the VID system 202*c* (which is producing VDI frames at 10 FPS higher than the endpoint device 206*a* can currently produce). However, while two specific examples are described above, one of skill in the art in possession of the present disclosure will appreciate how conventional frame rate systems may waste frame rate pipeline resources and/or provide non-optimized endpoint device experiences in a variety of manners.

Figure 5B:
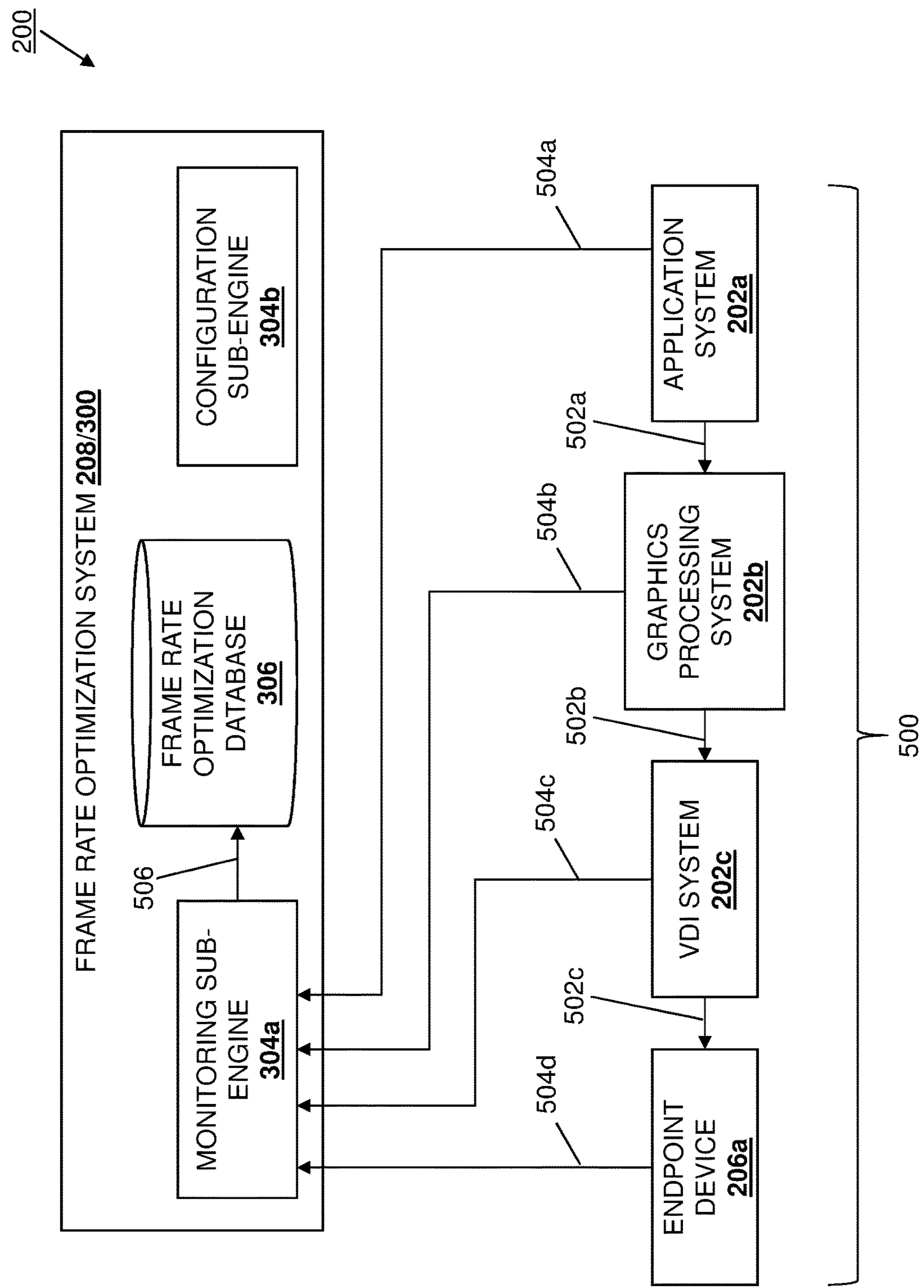
FIG. 5B is a schematic view illustrating an embodiment of the networked system of FIG. 2 and the frame rate optimization system of FIG. 3 operating during the method of FIG. 4.

The method 400 then proceeds to block 404 where a frame rate optimization system monitors the frame rate pipeline components to identify respective frame rate parameters. With reference to FIG. 5B, in an embodiment of block 404, the monitoring sub-engine 304*a* in the frame rate optimization engine 304 of the frame rate optimization system 208/300 may perform monitoring operations to monitor the frame rate processing operations performed by each of the frame rate pipeline components in the frame rate pipeline 500. In specific embodiments, the monitoring the frame rate processing operations performed by each of the frame rate pipeline components in the frame rate pipeline 500 may include monitoring frame rate parameters of those frame rate pipeline components using Application Programming Interfaces (APIs), performance monitors (e.g., "perfmon" provided by the WINDOWS® Reliability and Performance Monitor), PowerShell calls, and/or other monitoring tools that would be apparent to one of skill in the art in possession of the present disclosure.

For example, at block 404, the monitoring sub-engine 304*a* in the frame rate optimization engine 304 of the frame rate optimization system 208/300 may perform application monitoring operations 504*a* to monitoring the application frame rate processing operations performed by the application in the application system 202*a* in order to identify the application frame rate processing parameters for the application that may include an application frame rate setting, a maximum application frame rate capability, a delivered application frame rate, and/or any other application frame rate processing parameters that would be apparent to one of skill in the art in possession of the present disclosure. The monitoring sub-engine 304*a* in the frame rate optimization engine 304 of the frame rate optimization system 208/300 may then perform storage operations 506 to store the monitored application frame rate processing parameters in the frame rate optimization database 306.

Similarly, at block 404, the monitoring sub-engine 304*a* in the frame rate optimization engine 304 of the frame rate optimization system 208/300 may perform graphics processing system monitoring operations 504*b* to monitoring the graphics frame rate processing operations performed by the graphics processing system 202*b* in order to identify the graphics frame rate processing parameters for the graphics processing system 202*b* that may include a graphics frame rate setting, a maximum graphics frame rate capability, a delivered graphics frame rate, and/or any other graphics frame rate processing parameters that would be apparent to one of skill in the art in possession of the present disclosure. The monitoring sub-engine 304*a* in the frame rate optimization engine 304 of the frame rate optimization system 208/300 may then perform the storage operations 506 to store the monitored graphics frame rate processing parameters in the frame rate optimization database 306.

Similarly, at block 404, the monitoring sub-engine 304*a* in the frame rate optimization engine 304 of the frame rate optimization system 208/300 may perform VDI system monitoring operations 504*c* to monitoring the VDI frame rate processing operations performed by the VDI system 202*c* in order to identify the VDI frame rate processing parameters for the VDI system 202*c* that may include a VDI frame rate setting, a maximum VDI frame rate capability, a delivered VDI frame rate, and/or any other VDI frame rate processing parameters that would be apparent to one of skill in the art in possession of the present disclosure. The monitoring sub-engine 304*a* in the frame rate optimization engine 304 of the frame rate optimization system 208/300 may then perform the storage operations 506 to store the monitored VDI frame rate processing parameters in the frame rate optimization database 306.

Similarly, at block 404, the monitoring sub-engine 304*a* in the frame rate optimization engine 304 of the frame rate optimization system 208/300 may perform endpoint device monitoring operations 504*d* to monitoring the endpoint frame rate processing operations performed by the endpoint device 206*a* in order to identify the endpoint frame rate processing parameters for the endpoint device 206*a* that may include an endpoint frame rate setting, a maximum endpoint frame rate capability, a delivered endpoint frame rate, and/or any other endpoint frame rate processing parameters that would be apparent to one of skill in the art in possession of the present disclosure. The monitoring sub-engine 304*a* in the frame rate optimization engine 304 of the frame rate optimization system 208/300 may then perform the storage operations 506 to store the monitored endpoint frame rate processing parameters in the frame rate optimization database 306. As will be appreciated by one of skill in the art in possession of the present disclosure, the monitoring operations 504*a*-504*d* performed by the monitoring sub-engine 304*a* in the frame rate optimization engine 304 of the frame rate optimization system 208/300 may be performed continuously while the frame rate pipeline components in the frame rate pipeline 500 perform their respective frame rate processing operations to produce respective frames at respective frame rates, allowing block 406 (discussed below) to be performed whenever those frame rate processing operations by those frame rate pipeline components results in a non-optimized experience at the endpoint device 206*a* or wasted resources, discussed below.

The method 400 then proceeds to block 406 where the frame rate optimization system reconfigures at least one frame rate pipeline component based on frame rate parameter(s) identified for an endpoint device included in the frame rate pipeline components. In specific embodiments, the configuration of frame rate pipeline components in the frame rate pipeline 500 may include configuring frame rate parameters of those frame rate pipeline components using Application Programming Interfaces (APIs), performance monitors (e.g., "perfmon" provided by the WINDOWS® Reliability and Performance Monitor), PowerShell calls, Active Directly Group Policy Objects, a VDI management environment Graphical User Interface (GUI), and/or other configuration tools that would be apparent to one of skill in the art in possession of the present disclosure.

Figure 5C:
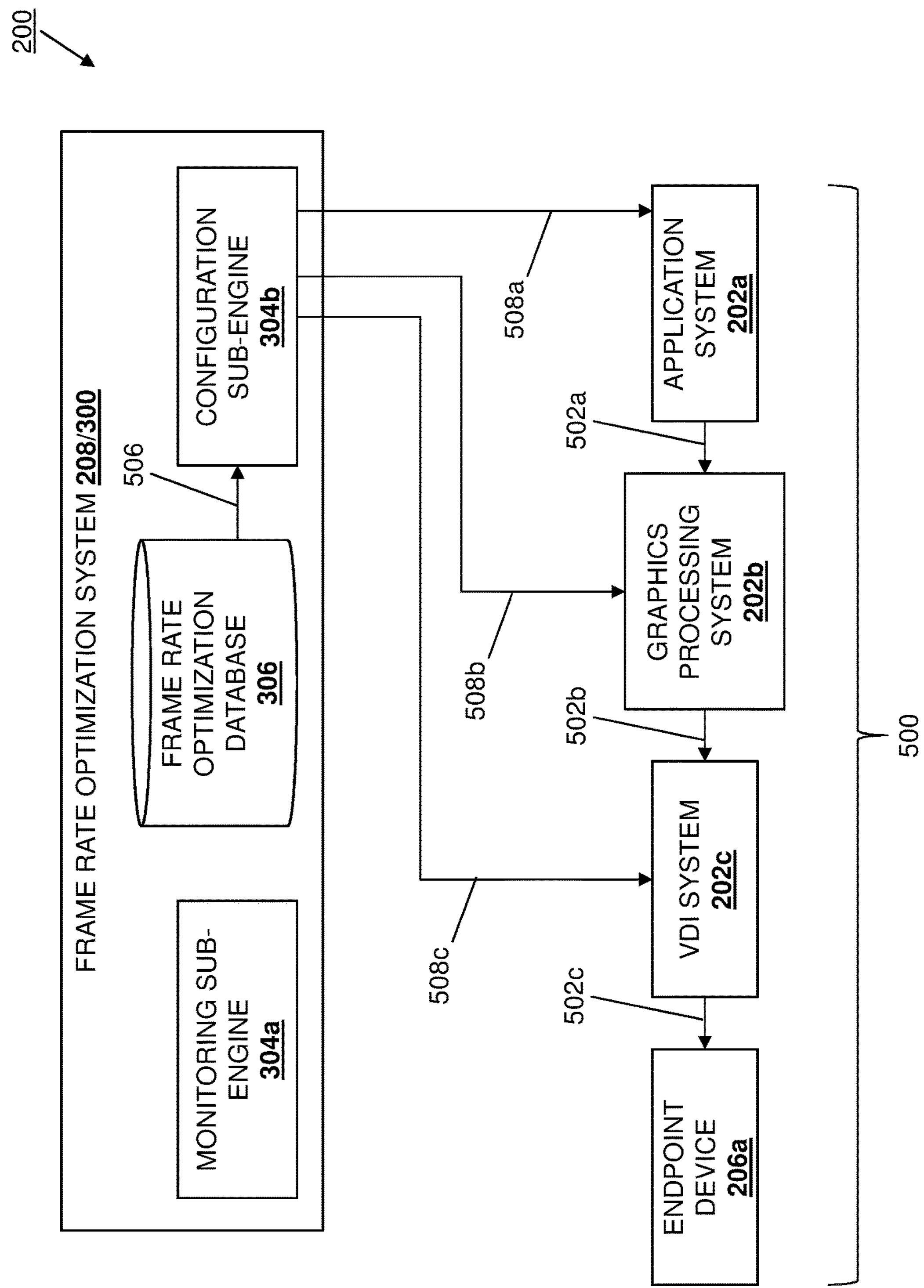
FIG. 5C is a schematic view illustrating an embodiment of the networked system of FIG. 2 and the frame rate optimization system of FIG. 3 operating during the method of FIG. 4.

With reference to FIG. 5C, in an embodiment of block 406, the configuration sub-engine 304*b* in the frame rate optimization engine 304 of the frame rate optimization system 208/300 may perform storage access operations 506 to access any of the monitored frame rate pipeline parameters in the frame rate optimization database 306, and then use any of those monitored frame rate pipeline parameters in configuration operations that reconfigure any of the application in the application system 202*a*, the graphics processing system 202*b*, and/or the VDI system 202*c* to perform the frame rate processing operations in a manner that optimizes the experience at the endpoint device 206*a* or reduces resource waste by the application in the application system 202*a*, the graphics processing system 202*b*, and/or the VDI system 202*c*. For example, at block 406 and based on endpoint device frame rate parameters, the configuration sub-engine 304*b* in the frame rate optimization engine 304 of the frame rate optimization system 208/300 may perform application configuration operations 508*a* to reconfigure the application in the application system 202*a* to perform second application frame rate processing operations that include rendering the frames to produce the application frames at a second application frame rate that is different than the first application frame rate produced by the first application frame rate processing operations.

In another example, at block 406 and based on endpoint device frame rate parameters, the configuration sub-engine 304*b* in the frame rate optimization engine 304 of the frame rate optimization system 208/300 may perform graphics processing system configuration operations 508*b* to reconfigure the graphics processing system 202*b* to perform second graphics frame rate processing operations that include rendering the application frames to produce the graphics frames at a second graphics frame rate that is different than the first graphics frame rate produced by the first graphics frame rate processing operations. Furthermore, one of skill in the art in possession of the present disclosure will appreciate how, in some cases, the second graphics frame rate processing operations performed by the graphics processing system 202*b* may include encoding operations (in addition to the rendering operations) to produce the graphics frames at the second graphics frame rate.

In another example, at block 406 and based on endpoint device frame rate parameters, the configuration sub-engine 304*b* in the frame rate optimization engine 304 of the frame rate optimization system 208/300 may perform VDI system configuration operations 508*c* to reconfigure the VDI system 202*c* to perform second VDI frame rate processing operations that include rendering the graphics frames to produce the VDI frames at a second VDI frame rate that is different than the first VDI frame rate produced by the first VDI frame rate processing operations. In many embodiments, the application configuration operations 508*a*, the graphics processing system configuration operations 508*b*, and/or the VDI system configuration operations 508*c* may be performed in a manner that provides the application frame rate processing operations, the graphics frame rate processing operations, and the VDI frame rate processing operations, respectively, performed by each of the application in the application system 202*a*, the graphics processing system 202*b*, and the VDI system 202*c*, respectively, to produce the application frame rate, the graphics frame rate, and the VDI frame rate, respectively, that are each equal to the current delivered endpoint frame rate of the endpoint device 206*a*. In other words, many embodiments of the present disclosure synchronize the processing operations of the application in the application system 202*a*, the graphics processing system 202*b*, and the VDI system 202*c* such that each produces a frame rate equal to the frame rate currently being delivered by the endpoint device 206*a*.

However, while application/graphics processing system/VDI system frame synchronization with a currently delivered endpoint frame rate are described herein, one of skill in the art in possession of the present disclosure will appreciate that other configurations will fall within the scope of the present disclosure as well. For example, configurations associated with endpoint system administrator preferences (e.g., arbitrary values based on a desired Quality of Service (QoS) level for frame rate) may result in non-synchronized configurations in some situations. In a specific example, a QoS requirement/policy may be defined for all applications, endpoint devices, and/or other subsystems, and may require a particular frame rate even in situations where the frame rate pipeline cannot currently deliver that frame rate (e.g., when the QoS requirement/policy was constructed without knowledge of the frame rate pipeline system that exists in a VDI environment). One of skill in the art in possession of the present disclosure will appreciate how the fundamental logic of the frame rate pipeline paradigm discussed above may be configured to honor such QoS requirements/policies despite the inability to satisfy them for some periods of time.

A few specific examples of the method 400 will now be described and, in those examples, the endpoint device monitoring operations 504*d* performed at block 404 includes identifying the delivered endpoint frame rate by the endpoint device 206*a*, while the VDI system monitoring operations 504*c* performed at block 404 may include identifying the VDI frame rate setting of the VDI system 202*c* and the maximum VDI frame rate capability of the VDI system 202*c*. However, while only some of the results of the endpoint device monitoring operations 504*d* and the VDI system monitoring operations 504*c* are described below as being used to perform particular configuration operations at block 406, one of skill in the art in possession of the present disclosure will recognize how a variety of different monitored frame rate parameters may result in different configuration operations may be performed at block 406 while remaining within the scope of the present disclosure.

In a first specific example, the configuration sub-engine 304*b* in the frame rate optimization engine 304 of the frame rate optimization system 208/300 may determine that the delivered endpoint frame rate is equal to the VDI frame rate setting and the maximum VDI frame rate capability and, in response, may perform the application configuration operations 508*a* to reconfigure the application in the application system 202*a* to perform the second application frame processing operations to produce the application frames at the second application frame rate that is equal to the first VDI frame rate (i.e., when then first application frame rate is not equal to the first VDI frame rate), and/or may perform the graphics processing system configuration operations 508*b* to reconfigure the graphics processing system 202*b* to perform the second graphics frame processing operations to produce the graphics frames at the second graphics frame rate that is equal to the first VDI frame rate (i.e., when then first graphics frame rate is not equal to the first VDI frame rate). In other words, if the endpoint device 206*a* is currently decoding VDI frames to produce endpoint frames at a delivered endpoint frame rate that is equal to both the VDI frame rate setting and the maximum VDI frame rate capability of the VDI system 202*c*, the frame rate optimization system 208/300 will ensure that both 1) the application in the application system 202*a* is rendering application frames at an application frame rate that is equal to that endpoint/VDI frame rate, and 2) the graphics processing system 202*b* is rendering (and in some cases, encoding) graphics frames at a graphics frame rate that is equal to that endpoint/VDI frame rate.

In another specific example, the configuration sub-engine 304*b* in the frame rate optimization engine 304 of the frame rate optimization system 208/300 may determine that the delivered endpoint frame rate is equal to the VDI frame rate setting and less than the maximum VDI frame rate capability and, in response, may perform the VDI configuration operations 508*c* to reconfigure the VDI system 202*c* to perform the second VDI frame processing operations to produce the VDI frames at the second VDI frame rate that is equal to the maximum VDI frame rate capability. In addition, the configuration sub-engine 304*b* in the frame rate optimization engine 304 of the frame rate optimization system 208/300 may also perform the application configuration operations 508*a* to reconfigure the application in the application system 202*a* to perform the second application frame processing operations to produce the application frames at the second application frame rate that is equal to the second VDI frame rate (i.e., when then first application frame rate is not equal to the second VDI frame rate), and/or may perform the graphics processing system configuration operations 508*b* to reconfigure the graphics processing system 202*b* to perform the second graphics frame processing operations to produce the graphics frames at the second graphics frame rate that is equal to the second VDI frame rate (i.e., when then first graphics frame rate is not equal to the second VDI frame rate).

In other words, if the endpoint device 206*a* is currently decoding VDI frames to produce endpoint frames at a delivered endpoint frame rate that is equal to the VDI frame rate setting and less than the maximum VDI frame rate capability of the VDI system 202*c*, the frame rate optimization system 208/300 will reconfigure the VDI system 202*c* to render VDI frames at a VDI frame rate that is equal to its maximum VDI frame rate capability, and ensure that both 1) the application in the application system 202*a* is rendering application frames at an application frame rate that is equal to that maximum VDI frame rate capability, and 2) the graphics processing system 202*b* is rendering (and in some cases, encoding) graphics frames at a graphics frame rate that is equal to that maximum VDI frame rate capability. As will be appreciated by one of skill in the art in possession of the present disclosure, rather than increasing the frame rate of frames being rendered and encoded by the frame rate pipeline 500 to the maximum frame rate capability of the VDI system 202*c*, the method 400 may be performed iteratively to increase the frame rate of frames being rendered and encoded by the frame rate pipeline 500 and provided to the endpoint device 206*a* until that frame rate is equal to the delivered endpoint frame rate of the endpoint device (thus optimizing the endpoint frame rate at the endpoint device 206*a*).

In yet another specific example, the configuration sub-engine 304*b* in the frame rate optimization engine 304 of the frame rate optimization system 208/300 may determine that the delivered endpoint frame rate is less than the VDI frame rate setting and, in response, may perform the VDI configuration operations 508*c* to reconfigure the VDI system 202*c* to perform the second VDI frame processing operations to produce the VDI frames at the second VDI frame rate that is equal to the delivered endpoint frame rate. In addition, the configuration sub-engine 304*b* in the frame rate optimization engine 304 of the frame rate optimization system 208/300 may also perform the application configuration operations 508*a* to reconfigure the application in the application system 202*a* to perform the second application frame processing operations to produce the application frames at the second application frame rate that is equal to the delivered endpoint/second VDI frame rate (i.e., when then first application frame rate is not equal to the delivered endpoint/second VDI frame rate), and/or may perform the graphics processing system configuration operations 508*b* to reconfigure the graphics processing system 202*b* to perform the second graphics frame processing operations to produce the graphics frames at the second graphics frame rate that is equal to the delivered endpoint/second VDI frame rate (i.e., when then first graphics frame rate is not equal to the delivered endpoint/second VDI frame rate).

In other words, if the endpoint device 206*a* is currently decoding VDI frames to produce endpoint frames at a delivered endpoint frame rate that is less than the VDI frame rate setting of the VDI system 202*c*, the frame rate optimization system 208/300 will reconfigure the VDI system 202*c* to render VDI frames at a VDI frame rate that is equal to the delivered endpoint device frame rate, and ensure that both 1) the application in the application system 202*a* is rendering application frames at an application frame rate that is equal to that delivered endpoint device frame rate, and 2) the graphics processing system 202*b* is rendering (and in some cases, encoding) graphics frames at a graphics frame rate that is equal to that delivered endpoint device frame rate. As will be appreciated by one of skill in the art in possession of the present disclosure, this specific example provides a situation where the endpoint device 206*a* may be "resource-constrained" or otherwise unable to decode the VDI frames to produce endpoint frames at an endpoint frame rate that is equal to its endpoint frame rate setting or maximum endpoint frame rate (e.g., identified via the endpoint monitoring operations 504*d* at block 404). In some embodiments and in response to the delivered endpoint frame rate being less than the VDI frame rate setting (or in other constrained resource situations), the frame rate optimization system 208/300 may be configured to transmit a constrained resources warning message to the endpoint device 206*a* for display on the endpoint device 206*a* (e.g., "your endpoint device does not have sufficient resources to display frames at your endpoint frame rate setting—component upgrades may remedy this", or "your endpoint device does not have sufficient resources to display frames at your endpoint frame rate setting—you may want to shut down other applications"), or to an administrator of the endpoint system 206 (e.g., "endpoint device 206*a* in your network does not have sufficient resources to display frames at its endpoint frame rate setting—component upgrades may remedy this").

Thus, systems and methods have been described that provide for the optimization of a frame rate pipeline to ensure that the frame rate being rendered and encoded for frames provided for display on an endpoint device is maximized for the current capabilities of that endpoint device to optimize the experience at the endpoint device while not wasting resources in the frame rate pipeline. For example, a networked system may include a frame rate pipeline including an application that produces application frames at a first application frame rate, a graphics processing system that processes the application frames to produce graphics frames at a first graphics frame rate, a VDI system that processes the graphics frames to produce VDI frames at a first VDI frame rate, and an endpoint device that processes the VDI frames to produce endpoint frames at an endpoint frame rate. A frame rate optimization system monitors the application processing, the graphics processing, the VDI processing, and the endpoint processing and, based on the endpoint frame rate, reconfigures at least one of: the application to produce the application frames at a second application frame rate, the graphics processing system to produce the graphics frames at a second graphics frame rate, or the VDI system to produce the VDI frames at a second VDI frame rate. The inventors of the present disclosure submit that the frame rate optimization system described herein provides the first frame rate optimization solution in the VDI market that comprehends the entire frame rate pipeline in a VDI environment, and configures that frame rate pipeline based on endpoint device frame rate parameters that provide an end-user experience in order to maximize that end-user experience (e.g., by maximizing the frame rate at the endpoint device), while also ensuring that frames are not rendered or encoded in the frame rate pipeline to a frame rate that provides no benefit to the end-user experience.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A networked system, comprising:

an application that is configured to perform first application frame processing operations to produce application frames at a first application frame rate;

a graphics processing system that is configured to perform first graphics frame processing operations on the application frames to produce graphics frames at a first graphics frame rate;

a Virtual Desktop Infrastructure (VDI) system that is configured to perform first VDI frame processing operations on the graphics frames to produce VDI frames at a first VDI frame rate;

an endpoint device that is configured to perform endpoint frame processing operations on the VDI frames to produce endpoint frames at delivered endpoint frame rate; and a frame rate optimization system that is coupled to the endpoint device, the VDI system, the graphics processing system, and the application system, wherein the frame rate optimization system is configured to:

monitor the first application frame processing operations performed by the application, the first graphics frame processing operations performed by the graphics processing system, the first VDI frame processing operations performed by the VDI system, and the endpoint frame processing operations performed by the endpoint device;

identify a VDI frame rate setting and a maximum VDI frame rate capability of the VDI system; and reconfigure, based on a relationship between the delivered endpoint frame rate produced for the endpoint frames by the endpoint device via the performance of the endpoint frame processing operations and at least one of the VDI frame rate setting and the maximum VDI frame rate capability of the VDI system, at least one of:

the application to perform second application frame processing operations to produce the application frames at a second application frame rate; or the graphics processing system to perform second graphics frame processing operations to produce the graphics frames at a second graphics frame rate.

2. The system of claim 1, wherein the endpoint device is coupled to the VDI system, the graphics processing system, and the application system via a network.

3. The system of claim 1, wherein the frame rate optimization system is configured, in response to the delivered endpoint frame rate being equal to the VDI frame rate setting and the maximum VDI frame rate capability, to reconfigure at least one of:

the application to perform the second application frame processing operations to produce the application frames at the second application frame rate that is equal to the first VDI frame rate; or the graphics processing system to perform the second graphics frame processing operations to produce the graphics frames at the second graphics frame rate that is equal to the first VDI frame rate.

4. The system of claim 1, wherein the frame rate optimization system is configured, in response to the delivered endpoint frame rate being equal to the VDI frame rate setting and less than the maximum VDI frame rate capability, to:

reconfigure the VDI system to perform the second VDI frame processing operations to produce the VDI frames at the second VDI frame rate that is equal to the maximum VDI frame rate capability; and reconfigure at least one of:

the application to perform the second application frame processing operations to produce the application frames at the second application frame rate that is equal to the second VDI frame rate; or the graphics processing system to perform the second graphics frame processing operations to produce the graphics frames at the second graphics frame rate that is equal to the second VDI frame rate.

5. The system of claim 1, wherein the frame rate optimization system is configured, in response to the delivered endpoint frame rate being less than the VDI frame rate setting, to:

reconfigure the VDI system to perform the second VDI frame processing operations to produce the VDI frames at the second VDI frame rate that is equal to the delivered endpoint frame rate; and reconfigure at least one of:

the application to perform the second application frame processing operations to produce the application frames at the second application frame rate that is equal to the second VDI frame rate; or the graphics processing system to perform the second graphics frame processing operations to produce the graphics frames at the second graphics frame rate that is equal to the second VDI frame rate.

6. The system of claim 5, wherein the frame rate optimization system is configured, in response to the delivered endpoint frame rate being less than the VDI frame rate setting, to:

transmit, for display on the endpoint device, a constrained resources warning message.

7. An Information Handling System (IHS), comprising:

a processing system; and a memory system that is coupled to the processing system and that includes instructions that, when executed by the processing system, cause the processing system to provide a frame rate optimization engine that is configured to:

monitor first application frame processing operations performed by an application to produce application frames at a first application frame rate, first graphics frame processing operations performed by a graphics processing system on the application frames to produce graphics frames at a first graphics frame rate, first Virtual Desktop Infrastructure (VDI) frame processing operations performed by a VDI system on the graphics frames to produce VDI frames at a first VDI frame rate, and endpoint frame processing operations performed by an endpoint device on the VDI frames to produce endpoint frames at delivered endpoint frame rate;

identify a VDI frame rate setting and a maximum VDI frame rate capability of the VDI system; and reconfigure, based on a relationship between the delivered endpoint frame rate produced for the endpoint frames by the endpoint device via the performance of the endpoint frame processing operations and at least one of the VDI frame rate setting and the maximum VDI frame rate capability of the VDI system, at least one of:

the application to perform second application frame processing operations to produce the application frames at a second application frame rate; or the graphics processing system to perform second graphics frame processing operations to produce the graphics frames at a second graphics frame rate.

8. The IHS of claim 7, wherein: the endpoint device is coupled to the VDI system, the graphics processing system, and the application via a network.

9. The IHS of claim 7, wherein the frame rate optimization engine is configured, in response to the delivered endpoint frame rate being equal to the VDI frame rate setting and the maximum VDI frame rate capability, to reconfigure at least one of:

the application to perform the second application frame processing operations to produce the application frames at the second application frame rate that is equal to the first VDI frame rate; or the graphics processing system to perform the second graphics frame processing operations to produce the graphics frames at the second graphics frame rate that is equal to the first VDI frame rate.

10. The IHS of claim 7, wherein the frame rate optimization engine is configured, in response to the delivered endpoint frame rate being equal to the VDI frame rate setting and less than the maximum VDI frame rate capability, to:

reconfigure the VDI system to perform the second VDI frame processing operations to produce the VDI frames at the second VDI frame rate that is equal to the maximum VDI frame rate capability; and reconfigure at least one of:

the application to perform the second application frame processing operations to produce the application frames at the second application frame rate that is equal to the second VDI frame rate; or the graphics processing system to perform the second graphics frame processing operations to produce the graphics frames at the second graphics frame rate that is equal to the second VDI frame rate.

11. The IHS of claim 7, wherein the frame rate optimization engine is configured, in response to the delivered endpoint frame rate being less than the VDI frame rate setting, to:

reconfigure the VDI system to perform the second VDI frame processing operations to produce the VDI frames at the second VDI frame rate that is equal to the delivered endpoint frame rate; and reconfigure at least one of:

the application to perform the second application frame processing operations to produce the application frames at the second application frame rate that is equal to the second VDI frame rate; or the graphics processing system to perform the second graphics frame processing operations to produce the graphics frames at the second graphics frame rate that is equal to the second VDI frame rate.

12. The IHS of claim 11, wherein the frame rate optimization system is configured, in response to the delivered endpoint frame rate being less than the VDI frame rate setting, to:

transmit, for display on the endpoint device, a constrained resources warning message.

13. The IHS of claim 7, wherein the reconfiguration of the at least one of the application or the graphics processing system synchronizes an application frame rate setting of the application, a graphics frame rate setting of the graphics processing system, and the VDI frame rate setting of the VDI system with the delivered endpoint frame rate produced by the endpoint device via the performance of the endpoint frame processing operations.

14. A method for optimizing frame rates, comprising:

monitoring, by a frame rate optimization system, first application frame processing operations performed by an application to produce application frames at a first application frame rate, first graphics frame processing operations performed by a graphics processing system on the application frames to produce graphics frames at a first graphics frame rate, first Virtual Desktop Infrastructure (VDI) frame processing operations performed by a VDI system on the graphics frames to produce VDI frames at a first VDI frame rate, and endpoint frame processing operations performed by an endpoint device on the VDI frames to produce endpoint frames at an endpoint frame rate;

identifying, by the frame rate optimization system, a VDI frame rate setting and a maximum VDI frame rate capability of the VDI system; and reconfiguring, by the frame rate processing system based on a relationship between the delivered endpoint frame rate produced for the endpoint frames by the endpoint device via the performance of the endpoint frame processing operations and at least one of the VDI frame rate setting and the maximum VDI frame rate capability of the VDI system, at least one of:

the application to perform second application frame processing operations to produce the application frames at a second application frame rate; or the graphics processing system to perform second graphics frame processing operations to produce the graphics frames at a second graphics frame rate.

15. The method of claim 14, wherein the endpoint device is coupled to the VDI system, the graphics processing system, and the application via a network.

16. The method of claim 14, further comprising:

reconfiguring, by the frame rate optimization system in response to the delivered endpoint frame rate being equal to the VDI frame rate setting and the maximum VDI frame rate capability, at least one of:

the application to perform the second application frame processing operations to produce the application frames at the second application frame rate that is equal to the first VDI frame rate; or the graphics processing system to perform the second graphics frame processing operations to produce the graphics frames at the second graphics frame rate that is equal to the first VDI frame rate.

17. The method of claim 14, further comprising:

reconfiguring, by the frame rate optimization system in response to the delivered endpoint frame rate being equal to the VDI frame rate setting and less than the maximum VDI frame rate capability, the VDI system to perform the second VDI frame processing operations to produce the VDI frames at the second VDI frame rate that is equal to the maximum VDI frame rate capability; and reconfiguring, by the frame rate optimization system in response to the delivered endpoint frame rate being equal to the VDI frame rate setting and less than the maximum VDI frame rate capability, at least one of:

the application to perform the second application frame processing operations to produce the application frames at the second application frame rate that is equal to the second VDI frame rate; or the graphics processing system to perform the second graphics frame processing operations to produce the graphics frames at the second graphics frame rate that is equal to the second VDI frame rate.

18. The method of claim 14, wherein, the frame rate optimization system reconfigures:

reconfiguring, by the frame rate optimization system in response to the delivered endpoint frame rate being less than the VDI frame rate setting, the VDI system to perform the second VDI frame processing operations to produce the VDI frames at the second VDI frame rate that is equal to the delivered endpoint frame rate; and reconfiguring, by the frame rate optimization system in response to the delivered endpoint frame rate being less than the VDI frame rate setting, at least one of:

the application to perform the second application frame processing operations to produce the application frames at the second application frame rate that is equal to the second VDI frame rate; or the graphics processing system to perform the second graphics frame processing operations to produce the graphics frames at the second graphics frame rate that is equal to the second VDI frame rate.

19. The method of claim 18, further comprising:

transmitting, by the frame rate optimization system in response to the delivered endpoint frame rate being less than the VDI frame rate setting and for display on the endpoint device, a constrained resources warning message.

20. The method of claim 14, wherein the reconfiguration of the at least one of the application or the graphics processing system synchronizes an application frame rate setting of the application, a graphics frame rate setting of the graphics processing system, and the VDI frame rate setting of the VDI system with the delivered endpoint frame rate produced by the endpoint device via the performance of the endpoint frame processing operations.

* * * * *